2,790,718
PROCESS OF MANUFACTURING FERMENTED BEVERAGES

Anthony L. Nugey, Rahway, N. J., assignor to Knit Wear Patents, Inc., Atlanta, Ga., a corporation of Georgia No Drawing. Application April 3, 1953,
Serial No. 346,807

5 Claims. (Cl. 99—51)

This invention relates to improvements in the production of beer; the term "beer" as used herein including malt beverages such as ale, porter, stouts, Weissbeer and the like produced by spontaneous and rapid top fermentation with yeast at comparatively high temperatures; also lager produced by bottom fermentation at not less than 43° F. nor more than 52° F. pitching temperatures; and all other beverages generally classified as beers.

In the manufacture of beer by well-known methods, an aqueous extract termed "wort" is derived from a mash of malt, prepared cereals, carbohydrates, and unmalted, raw (unprepared) cereals which require complete gelatinization of their respective starchy substances before being combined with extracts derived from malt and prepared cereals previously referred to. The carbohydrates, consisting of fermentable solid sugars and syrups are not mixed with the mash, but are always added directly into the brew-kettle.

The use of unmalted, or raw or unprepared cereals to replace part of the malt comprising the brew, ranges from 25–50% of such raw cereals to 75–50% of malt, and has been found to produce finished beers of lighter color, less satiating, with greater stability, more snap and character, and at a saving in costs.

The most commonly used unmalted or raw cereals are corn grits, rice, rice flour, corn meal, refined (pure cornstarch) grits and the like. These unmalted or raw cereals must be prepared by pre-cooking them in a separate vessel, commonly termed a "rice tub," "meshing kettle," "converter" or "cereal cooker."

The general practice is to mix these raw cereals with water, or a combination of them with water together with 10% to 35% by weight of finely ground malt; in certain instances quantities of these raw cereals, or a combination of them, are mixed with equal quantities of finely ground malt and this mixture is progressively heated to an elevated temperature by any suitable means to burst the starchy granules, and yield finally a gelatinized starch-paste. This gelatinized starch-paste is subsequently combined with the malt mash, previously or simultaneously prepared in the mash tube or lauter tub, where all of it is saccharified and converted into readily fermentable sugars and very slow fermentable dextrins by cereal (diastatic) enzymes present in the malt. I have grouped these enzymes into five classes, namely, cereal enzymes present in malted cereals and in malts; bacterial enzymes produced by specific bacteria; fugal enzymes from fungal growth; animal enzymes extracted from warm-blooded animals and plant enzymes derived from natural plants.

The malt and cereal proteins present in the mash are degraded into proteoses, peptones, amino-acids and other intermediate fractions, which serve as yeast nutrients, foam-forming substances, and impart the smooth-mellow flavor for the palate. The proteins are degraded by proteolytic enzymes obtained from sources named above.

The raw cereals are pre-cooked as described herein. This operation is carried out under atmospheric and above atmospheric pressures; in other words, in cereal cookers of two general types, those which operate at atmospheric pressure equal to 212° F. temperature, and those that operate above atmospheric pressure having the equivalent temperature of 250° F., and higher.

Inasmuch as the aforementioned raw cereals are devoid of enzymes-diastases and peptases, the common practice is to mix such raw cereals with certain amounts of ground malt as previously described, to adequately gelatinize not only raw cereal starches but also the starches present in the malt itself which has been added to bring about the gelatinization phase.

The only purpose of adding malt into cereal cookers conjointly with the raw cereals is to liquefy, and keep the starchy-material in its liquid-form, and permit boiling operations until all of the starch has been wholly and completely gelatinized. Unless all of the starchy-material has been effectively gelatinized a considerable loss in extract will result, for it is well-known that malt enzymes introduced by the malt into the mash tub, or lauter tub mashes, will not act or ungelatinized starch. In addition to this, the wort-runnoff would be greatly impeded, pitched yeast will be adversely affected, and the finished beer will be too difficult to filter and clarify.

If malt was omitted from the raw cereal mash and such mash was heated it would thicken into a very viscous paste, making it impossible to continue further heating or to operate the mashing agitator, and consequently the raw cereal starch would not be fully gelatinized. The mash begins to thicken into a viscous paste at about 154° F.; the higher the temperature the speedier the reaction and the more viscous becomes its properties. It cannot be handled in this state, it adheres tenaciously to cooker sides making it very difficult to remove and thereby becomes a total loss.

Malt has a protein content ranging from 8% to around 14% depending upon the type of barley used in its preparation. The diastatic value ranges from 28° to about 160° Lintner. The peptases in the malt are correlated with the protein content; malt low in proteins will have a low peptic property and high protein content indicates a higher peptic property. When malt is improperly modified and/or incorrectly kiln dried, the enzymic powers to liquefy starches are wholly inadequate, in fact the malt is even incapable of liquefying its own starch, nor can it properly degrade its proteins or those present in certain raw cereals.

The ground malt added into the cereal cookers to effect gelatinization of raw cereal, must first be permitted to petonize its proteins, which means that the cooker mash must be kept at peptonization temperature 100°–122° F. (optimum 111° F.) for a period of not less than 60 minutes, but preferably 75 minutes. In carrying out the peptonizing operation the temperature must not exceed 122° F. to avoid inactivation of the peptic enzymes which occurs quite speedily as the temperature of 156° F. is approached. Similarly, diastatic enzymes are speedily destroyed as the temperature approaches 175° F. When indicating thermometers are inaccurately calibrated, or do not uniformly register the prevailing mash temperature correctly, the degree of operating within enzymic safety is diminished; consequently, the neutralized or inactivated enzymes will not have the power to carry out adequate peptonization, nor will gelatinization of all starchy-material be satisfactorily completed. After gelatinization has been completed, boiling of the mash is usually continued for periods of from 15 to 60 minutes, depending on the raw cereal used and on its degree of granulation.

The protein content in some raw cereals, like rice and corn products, differs from that present in malt because it is in an unmodified form, therefore wholly insoluble. Malt enzymes cannot act on such proteins because the enzymes themselves are insoluble in the mash water, besides they are easily inactivated at moderate temperatures, as already stated. Improperly peptonized, or undegraded proteins are the chief sources of turbidities and the formation of dusty-precipitates.

It is also well-known that malt contains from 8 to 12% of malt husks, which form the sacks for retaining the starch of the malt kernel. The husk is not a part of the malt kernel, but belongs to the refuse foliage of the barley plant. These malt husks, which are ordinary straw, contain color-pigments ranging from yellow to tints of blues, purples, browns and blacks, produced by the soil and intensified through malting procedures. The malt husks also contain tannins, resinous matter and various buffers. Analyses also reveal that malt contain from 2% to 3% of viscous fatty liquids which possess bitter and unpleasant taste. The resinous matter from husks and viscous fatty liquids are deposited on surfaces of yeast cells causing early yeast degeneration which contribute to off-flavors and off-odors. The higher the kiln drying temperatures are maintained the greater the percentages of melanoidins formed, and these also have the property to darken wort and beer.

Raw cereals mentioned herein, are the accepted adjuncts for brewing lighter (paler) beers of longer stability, but this fact is wholly ignored when malt is used to gelatinize raw cereals in atmospheric or pressure operated cereal cookers. All of the inherent advantages are lost when raw cereals are cooked jointly with malt; coloring pigments released from the malt husks darken the worts and finished beers; tannins impart harsh and acrid flavors; resinous matter accounts for some of the objectionable tastes, the viscous fatty liquids leached out of the malt further increases bad odors as well as bitterness. Pressure cooking, or overcooking intensifies contamination; the buffers released by the malt make it difficult to control accurate brewing procedures due to uncontrollable reactions on account of variable pH values. Also, at these higher cooking temperatures some fractions of the malt proteins are decomposed; thus further affecting taste, flavor and stability. And finally more heat energy is consumed because of longer cooking periods as shown by tests.

In order to reduce the intensity of off-tastes, strawy flavors and bad odors it has been suggested that a minimum of malt be used in the cereal cookers conjointly with the raw cereals; that is about 10% of ground malt with 90% of raw cereals; but this practice defeats the purpose as there is a great loss in extract and all of the troublesome problems remained unsolved.

I have discovered that when worts made with dehusked malt are added in cereal cookers to the raw cereals, the resultant mash is not so much contaminated; the finished beer is not too intensely darkened, but I also found that complete gelatinization of raw cereals was not accomplished, nor were difficulties caused by improperly peptonized proteins effectually solved.

I have now discovered that worts resulting from raw cereals, and gelatinized with specific heat-stable, odorless and soluble enzymic preparations yield very brilliant beers with a shelf-life two to three times longer than those produced with malt gelatinization. Also, the beer is paler due to the absence of malt-husk contaminants; the flavor very mild; the taste is extremely pleasant and the finest ethereal aroma is generated. A comparison of finished beers made with malt-gelatinized raw cereals, and heat-stable, odorless and soluble enzymic preparations are shown herewith:

| Raw Cereals Gelatinized with Ground Malts | | | Physical Beer Properties | Raw Cereals Gelatinized with Heat-stable Enzymes | | |
|---|---|---|---|---|---|---|
| No. 1 | No. 2 | No. 3 | | No. 4 | No. 5 | No. 6 |
| 11.18 | 11.60 | 12.00 | Original Gravity, B.... | 11.81 | 11.82 | 11.88 |
| 3.85 | 4.20 | 5.25 | Color, Deg. Lovibond.. | 2.40 | 2.10 | 2.00 |
| 0.39 | 0.36 | 0.40 | Percent Proteins....... | 0.36 | 0.26 | 0.35 |
| Grainy taste, Sulfidic and Strawy Flavors. | | | Taste and Flavors..... | Clean taste, aromatic odor, no strawy flavors. | | |

The object of this invention is therefore to provide a process and product by which it will be possible to substantially accelerate the use of raw cereals by more thorough gelatinization of their respective starches, without contamination, resulting in economy of manufacturing costs, together with quality improvement of malt beverages produced.

Another object is to eliminate the use of malt and/or malted cereals from cooker, or converter mashes where raw cereal gelatinization is conducted.

A further object is to gelatinize raw cereal starches more efficiently without contamination of worts and finished beers with the undesirable properties which are always present in malt husks, as well as in the malt itself, and to eliminate introducing unpeptonized malt and cereal proteins into finished beers which effect shelf-life and brilliancy. And an additional object is to inoculate raw cereal mashes with heat-stable, odorless and soluble, high potency enzymic preparations.

Well suited for my purposes are the heat-stable, odorless and soluble enzymes derived from cultured strains resulting from the growth of bacteria belonging to *B. Subtilis* or *B. mesentericus* groups and/or combinations of both, which are sources of extremely heat resistant, high potency amylolytic (starch liquefying) and proteolytic (protein splitting) enzymes.

Also suited for my purpose are high potency and heat-stable odorless and soluble enzymes obtained from thermophylic bacteria capable of starch liquefaction and proteolysis.

Further suited for my purpose are the high potent and heat-stable odorless and soluble fungal enzymes capable of amylolytic and proteolytic activities.

By heat stable, or heat resistant, I mean all fungal and bacterial amylases and proteases having high potency amylolytic and proteolytic activities capable of withstanding temperatures up to 205° F. with a working range between 100° F. and 200° F.

Bacterial and fungal enzymic reactions are accelerated as the temperature is increased, without any inhibition. When reactions are carried out in the presence of calcium-ions, phosphates and sodium salts, this greatly increases the liquefying action of the enzymes and serves besides as stabilizing mediums, thereby preventing deterioration to the enzymic preparations.

Cooker mashing operations should be conducted to ensure maximum extract from raw cereals. The general practice is to use choice pedigreed malt, which has been carefully cleaned of all foreign substances, such as rootlets, sprouts, loose husks, and dust; then it is finely ground, prior to its introduction in the cereal cooker with the raw cereals. I have discovered that a very substantial gain in extract is produced by substituting heat-stable odorless and soluble high potency enzymic preparations, previously described, in place of malt. The comparative yields are as follows:

| Raw Cereals, 100 lbs. each | Pounds Extract with finely ground choice malts | Pounds Extract with heat-stable, high potency enzymes |
|---|---|---|
| Corn Grits (Coarse)........................ | 75 | 76½–77 |
| Refined Grits (Cornstarch)................ | 90 | 94 |
| Rice (Whole Kernels) ..................... | 78–80 | 82–84½ |
| Rice Flour ................................ | 77½–79½ | 83–85½ |

In the preferred method of practising my invention, the raw cereals such as, corn grits, rice products, or refined (cornstarch) grits, etc, or mixtures thereof, are mashed in the cereal cooker with sufficient water (about 250–300 lbs. of water to each 100 lbs. of raw cereal)

at a temperature of 110°–115° F., which is below the starch gelatinization temperature of these raw cereals.

A slurry is then made up of the heat-stable, odorless and soluble high potency enzymes with a small quantity of water of 110°–115° F. temperature and this is added into the cereal cooker at the same time that the raw cereals are charged therein. The preferable pH of the mash water is 6.0–6.5.

The raw cereals together with the slurry of the enzyme preparation is ready for heating, the "come up time" is usually 15 minutes from 110°–115° F. to 212° F.; and the boiling period ranges from 10 minutes to 30 minutes at 212° F. (or higher if pressure cooker is used) at the conclusion of which the starchy-material has been wholly and completely gelatinized. The mass is then added to the malt mash and the beer finished in the usual way as explained in column 1 hereof.

It is not necessary to make a slurry with the heat-stable, odorless and soluble high potency enzymes, since the enzyme can be easily and quickly inoculated in dry powdered form, as long as care is exercised not to waste the enzyme preparation, and to properly disperse same throughout the entire mash surface.

The acceleration of raw cereal gelatinization with my invention is very obvious due to the fact that no peptonization is needed, and as shown herein:

|  | A<br>Total gelatinization time using finely ground malts | B<br>Total gelatinization time using heat-stable high potency enzymes |
| --- | --- | --- |
| Refined grits (cornstarch) | 60 minutes (plus) | 30 minutes. |
| Rice products | 70 minutes (plus) | 45 minutes. |
| Corn grits | do | Do. |

In Table "A" only 30 minutes was figured for pre-peptonization of malt, but actually this pre-peptonization needs from 60 to 75 minutes, which means that total gelatinization in Table "A" should be increased by 30 to 45 minutes.

By pressure cooking the time is reduced when raw cereals are gelatinized with heat-stable high potency enzymes, and there is no contamination, which is always present when cereals are gelatinized with malt or malted cereals.

The mash consistency resulting from gelatinizing raw cereals with heat-stable, odorless and soluble enzymic preparations, remains thin, very fluid and free-flowing throughout the entire boiling period, it will not adhere to cooker sides, and has a clean and aromatic odor with distinctive taste, free from strawy-flavors, which were always present when such raw cereals were gelatinized with malt.

For this purpose a quantity of 25 to 100 grams of heat-stable, odorless and soluble high potency enzymes are added into the cooker mash with each 100 lbs. of aforesaid raw cereals or mixtures of several of aforesaid raw cereals; and to prevent losses of enzymic preparation, and to disperse more readily into the raw cereal mashes, and to stabilize and activate said enzymic preparations, I add to the above proportions of enzymes, salts of calcium, phosphate and sodium, in the proportion of 15 to 25 parts, to 1 to 4 parts of said enzymes, on as is basis, premixed prior to use. But I have successfully, with diligence and care, inoculated said raw cereal mashes without preparing pre-mixtures of said enzymes with the stated salts, and satisfactorily gelatinized all of the above mentioned raw cereals. These salts of calcium, phosphate and sodium are present in mashing waters as natural compounds, or have been added artificially to the mash water by means of the well-known Burton salts which are comprised of calcium sulfate, sodium chloride and phosphate buffers.

Having described my invention, what I believe to be new is:

1. The method of producing a mash for use in making beer which consists in mingling raw cereal from the group consisting of corn grits, rice, rice flour, corn meal and corn starch grits and mixtures thereof, with water having a temperature of 110 to 115 degrees Fahrenheit, adding to said water and cereal, a quantity of heat-stable, soluble, high potency enzymes and water at 110 to 115 degrees Fahrenheit, immediately beginning to raise the temperature of the mass to at least 212 degrees Fahrenheit, and causing the starchy material in the cereal to be wholly gelatinized and liquefied, and then mingling the entire mass with a main malt mash for conversion of the starchy material into sugars and dextrins, to finish the beer.

2. The method of producing a mash for use in making beer which consists in mingling raw cereal from the group consisting of corn grits, rice, rice flour, corn meal and corn starch grits and mixtures thereof, with water having a temperature of 110 to 115 degrees Fahrenheit, adding to said water and cereal a quantity of heat-stable, soluble, high potency enzymes and water having a pH of 6.0 to 6.5, immediately beginning to raise the temperature of the mass to at least 212 degrees Fahrenheit and causing the starchy material in the cereal to be wholly gelatinized and liquefied, and then mixing the entire mass with a main malt mash for conversion of the starchy material into sugars and dextrins, to finish the beer.

3. The method of producing a mash for the use in making beer which comprises mingling raw cereal from a group consisting of corn grits, rice, rice flour and corn starch grits or mixtures thereof with water at 110 to 115 degrees Fahrenheit, in the proportion of 100 lbs. of cereal and 250 to 300 lbs. of water, adding thereto 25 to 100 grams of heat-stable high potency, soluble enzymes and a small quantity of water having a temperature of 110 to 115 degrees Fahrenheit, immediately beginning to raise the temperature of the entire mass to 212 degrees Fahrenheit and causing the starchy material in the cereal to be wholly gelatinized and liquefied, and then mixing the mass with a main malt mash for conversion of the starchy material into sugars and dextrins, to finish the beer.

4. The method of producing a mash for the use in making beer which comprises mingling raw cereal from a group consisting of corn grits, rice, rice flour and corn starch grits or mixtures thereof with water at 110 to 115 degrees Fahrenheit in the proportion of 100 lbs. of cereal and 250 to 300 lbs. of water, adding thereto 25 to 100 grams of heat-stable high potency, soluble enzymes and a small quantity of water having a pH 6.0 to 6.5, immediately starting to raise the temperature of the entire mass to 212 degrees Fahrenheit and causing the starchy material in the cereal to be wholly gelatinized and liquefied, and then mixing the mass with a main malt mash for conversion of the starchy material into sugars and dextrins, to finish the beer.

5. The method of producing a mash for use in making beer which consists in mingling raw cereal from the group consisting of corn grits, rice, rice flour, corn meal and cornstarch grits and mixtures thereof, with water, adding to said water and cereal, a quantity of heat-stable, soluble, high potency enzymes, immediately beginning to raise the temperature of the mass to at least 212 degrees Fahrenheit, and causing the starchy material in the cereal to be wholly gelatinized and liquefied, and then mingling the entire mass with a main malt mash for conversion of the starchy material into sugars and dextrins, to finish the beer.

References Cited in the file of this patent
UNITED STATES PATENTS

| | | |
|---|---|---|
| 2,153,445 | Willaman et al. | Apr. 4, 1939 |
| 2,414,669 | Reich | Jan. 21, 1947 |
| 2,442,806 | Gluek | June 8, 1948 |

OTHER REFERENCES

"The Chemistry and Technology of Enzymes" by Henry Tauber, published 1949 by John Wiley and Sons Incorporated, New York, N. Y., pages 396 and 397.